(12) United States Patent
Gangopadhyay et al.

(10) Patent No.: US 6,973,638 B1
(45) Date of Patent: Dec. 6, 2005

(54) EXECUTION OF EXTENDED ACTIVITY DIAGRAMS BY CODE GENERATION

(75) Inventors: Dipayan Gangopadhyay, Cupertino, CA (US); Prashant Gupta, Monterey, CA (US); Haleh Mahbod, Saratoga, CA (US); Anant Vasant Prabhudesai, Foster City, CA (US); Srinivasan Suresh, Alameda, CA (US); William Wei Man Wong, San Bruno, CA (US)

(73) Assignee: International Business Machines Corporation, Armonk, NY (US)

( * ) Notice: Subject to any disclaimer, the term of this patent is extended or adjusted under 35 U.S.C. 154(b) by 735 days.

(21) Appl. No.: 09/724,830

(22) Filed: Nov. 28, 2000

Related U.S. Application Data

(63) Continuation of application No. 09/042,387, filed on Mar. 12, 1998.

(51) Int. Cl.[7] .............................................. G06F 9/44
(52) U.S. Cl. ...................... 717/104; 717/105; 717/106; 717/119; 717/156; 718/106
(58) Field of Search ............................... 717/100–107, 717/108, 109, 110, 113, 115, 125, 135, 136, 717/119–120, 156; 715/734, 853; 707/100; 345/440, 542; 718/106; 712/8, 11

(56) References Cited

U.S. PATENT DOCUMENTS

| | | | | |
|---|---|---|---|---|
| 4,860,204 A | * | 8/1989 | Gendron et al. | 717/109 |
| 4,928,247 A | * | 5/1990 | Doyle et al. | 345/853 |
| 5,187,788 A | * | 2/1993 | Marmelstein | 717/109 |
| 5,287,511 A | * | 2/1994 | Robinson et al. | 717/106 |
| 5,375,074 A | * | 12/1994 | Greenberg et al. | 703/17 |
| 5,481,712 A | * | 1/1996 | Silver et al. | 717/109 |
| 5,490,246 A | * | 2/1996 | Brotsky et al. | 345/763 |
| 5,621,726 A | * | 4/1997 | Murakimi | 370/255 |
| 5,740,463 A | * | 4/1998 | Oshima et al. | 712/11 |
| 5,748,959 A | * | 5/1998 | Reynolds | 718/106 |
| 5,768,506 A | * | 6/1998 | Randell | 709/202 |
| 5,852,449 A | * | 12/1998 | Esslinger et al. | 345/473 |
| 5,999,730 A | * | 12/1999 | Lewis | 717/109 |
| 6,046,742 A | * | 4/2000 | Chari | 715/734 |
| 6,104,874 A | * | 8/2000 | Branson et al. | 717/108 |
| 6,106,575 A | * | 8/2000 | Hardwick | 717/119 |
| 6,148,349 A | * | 11/2000 | Chow et al. | 710/33 |
| 6,192,511 B1 | * | 2/2001 | Johnston et al. | 717/109 |
| 6,247,077 B1 | * | 6/2001 | Muller et al. | 710/74 |
| 6,292,933 B1 | * | 9/2001 | Bahrs et al. | 717/107 |
| 6,337,696 B1 | * | 1/2002 | Lindhorst et al. | 345/763 |
| 6,337,702 B1 | * | 1/2002 | Bates et al. | 345/857 |
| 6,509,898 B2 | * | 1/2003 | Chi et al. | 345/440 |
| 6,753,873 B2 | * | 6/2004 | Dixon et al. | 345/542 |

OTHER PUBLICATIONS

Title: Modeling Concurrently in parallel Debugging, author: Hseush et al, ACM, 1990.*
Title: Data Flow Analysis for Verifying Properties of Concurrent Programs, author: Dwyer et al, ACM, 1994.*

* cited by examiner

Primary Examiner—Chameli C. Das
(74) Attorney, Agent, or Firm—Michael J. Buchenhorner; Ray Strimaitis

(57) ABSTRACT

A process modeling tool for graphically representing a process which includes transactions and events, and for generating computer code representing the process. A graphical tool creates a graphical representation of the transactions and events with graphical symbols, where one or more of such transactions and events may be of an asynchronous nature. A code generator generates computer code in response to information contained in the graphical representation. The computer code is executable on a computer system to cause the computer system to perform one or more operations which emulate the process shown in the graphical representation.

4 Claims, 14 Drawing Sheets

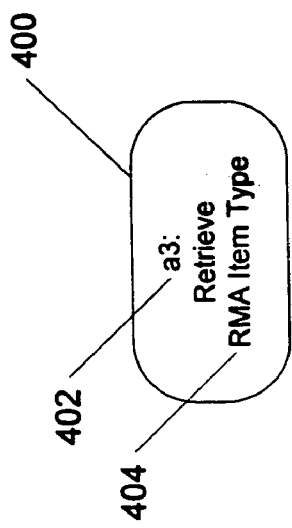
FIG. 4
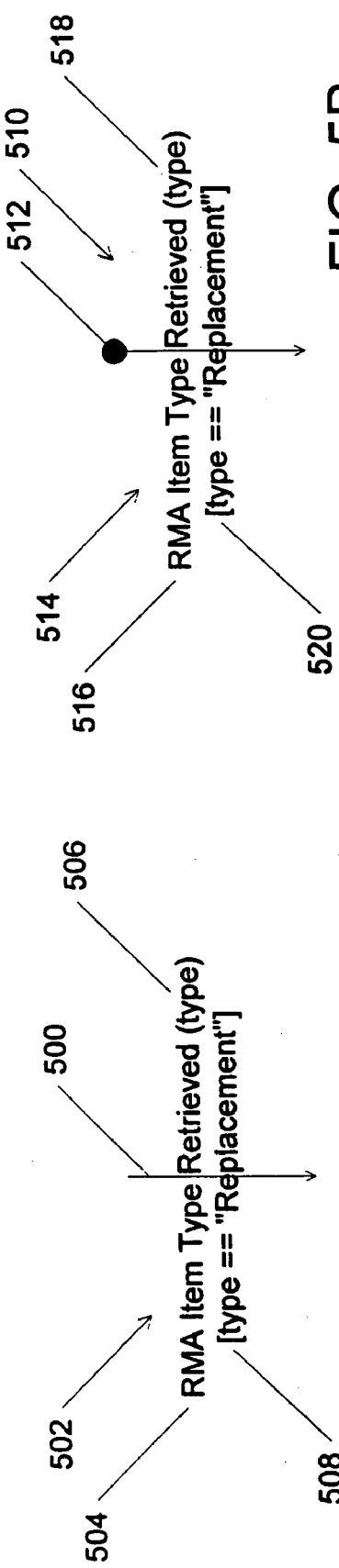
FIG. 5B
FIG. 5A

EXECUTION OF EXTENDED ACTIVITY DIAGRAMS BY CODE GENERATION

This application is a continuation of Ser. No. 09/042,387 filed Mar. 12, 1998.

The invention relates to process modeling and more particularly to the graphical representation of processes and the generation of executable code from such a representation.

BACKGROUND OF THE INVENTION

An interaction between multiple parties typically includes a sequence of steps. A graphical representation is a useful tool for illustrating the content of such an interaction. By showing the steps in a visual form observers as well as participants often more clearly understand the nature of the interaction taking place.

In real world interactions, the sequence of steps is often complex, especially when modeling a prospective interaction rather than one which has already occurred. Multiple possible resolutions may arise at each step. In addition, events may arise asynchronously or in parallel. These complications are difficult to represent with conventional modeling tools which are more suited to linear interactions. Conventional modeling tools typically do not offer functionality to represent the complex flow management inherent in real world activities in a easily usable and understandable manner.

A particular type of interaction which is complex and benefits from a graphical representation is the steps of an interaction between multiple computer applications operating in a common environment. This type of interaction may usually be divided into processes along functional lines, where a process involves applications performing actions in the interaction to accomplish a particular function. However, often these processes involve multiple computer applications interacting and may be characterized by asynchronous, parallel, and iterative behavior. Simple flow charts are generally not adequate to display these processes.

One type of graphical representation used to model activities is a conventional activity diagram. Conventional activity diagrams include nodes and links, where each node typically represents a function or action to be performed and each link typically represents a transition from one action to the next. However, conventional activity diagrams are limited in that they typically do not provide a representation for exceptions (errors arising during an interaction or activity), events occurring independently of actions, repetitive actions, or compensating actions, such as rollback procedures.

While conventional modeling tools are useful for providing a visual representation of simple interactions, ultimately usable and executable code is required to implement an interaction. At best, conventional modeling tools provide a starting point for code development. The visual representations produced by these modeling tools are most often only used in the planning of an interaction. Time could be saved by combining the planning stage and the implementation stage.

SUMMARY OF THE INVENTION

The preferred embodiment of the present invention provides a process modeling tool which creates, displays, and edits graphical representation of processes, including processes with non-linear or asynchronous actions. Through combinations of various elements such as action nodes, event links, and special purpose nodes such as split nodes and join nodes, complex processes are modeled, including events and functions which are asynchronous, parallel, or iterative. Generally, a process is modeled as a series of action nodes connected by event links. In addition, service requests are made from action nodes to objects associated with the process.

The process modeling tool may also be used to generate executable code based upon a graphical representation of a process. Associated with each element of a graphical representation is a code fragment. A code generator engine parses the graphical representation and uses the code fragments in addition to library resources to create a executable version of the process which has been modeled.

One embodiment provides a process modeling tool for graphically representing a process which includes transactions and events, comprising: a computer system including a display device, a data storage device, and a user interface device; a graphical tool which a user operates through the user interface device to create a graphical representation of the transactions and events with graphical symbols shown on the display device, where one or more of such transactions and events may be of an asynchronous nature.

Another embodiment provides a process modeling tool for generating computer code, where the code is based upon a graphical representation of a process, comprising: a computer system including a display device, a data storage device, and a user interface device; a traversal tool which traverses the graphical representation; a code generator which generates computer code in response to information contained in the graphical representation and information received from the traversal tool, where the computer code is stored on the data storage device and is executable on the computer system to cause the computer system to perform one or more operations which emulate the process shown in the graphical representation.

Another embodiment provides a process modeling tool for graphically representing a process which includes transactions and events, and for generating computer code representing the process, comprising: a computer system including a display device, a data storage device, and a user interface device; a graphical tool which creates a graphical representation of the transactions and events with graphical symbols, where one or more of such transactions and events may be of an asynchronous nature; a traversal tool which traverses the graphical representation; a code generator which generates computer code in response to information contained in the graphical representation and information received from the traversal tool, where the computer code is executable on the computer system to cause the computer system to perform one or more operations which emulate the process shown in the graphical representation.

Another embodiment provides a method for modeling a process including an ordered sequence of actions each characterized by one or more triggering events and exit events, the method comprising: graphically representing the sequence of actions and associated trigger and exit events for the process with graphical elements such that the graphical elements are organized to express the process, where functions within the process are represented as action nodes having associated therewith entry and exit criteria and an executable function; entry and exit criteria for functions within the process are represented as event links having associated therewith a conditional expression that must be satisfied if entry or exit from an action node is to commence; generation of two or more parallel events within the process is represented by split nodes with two or more asynchronous exit conditions; synchronization of two or more asynchronous events within the process is represented by join nodes with two or more asynchronous entry conditions; and repetitive functions are represented within the process as repetition nodes characterized by entry and exit criteria and an executable function that includes a repeatable function and repetition factor for controlling a number of repetitions for the repeatable function.

Another embodiment provides a method for modeling a process comprising: traversing a graphical representation of the process; generating computer code to represent functions and execution flow within the process, where the computer code is executable on a computer system.

Another embodiment provides a method for modeling a process comprising: creating a graphical representation of the process where functions within the process are represented as action nodes, events within the process are represented as event links, generation of two or more parallel events within the process is represented by split nodes, synchronization of two or more asynchronous events within the process is represented by join nodes, repetitive functions within the process are represented as repetition nodes; traversing the graphical representation of the process; generating computer code to represent functions and execution flow within the process, where the computer code is executable on a computer system.

Another embodiment provides a method for modeling a process comprising: creating a graphical representation of the process as an extended activity diagram where functions within the process are represented as action nodes, events within the process are represented as event links, independent events are represented as independent event nodes, exceptions are represented as exception nodes, generation of two or more parallel events within the process is represented by split nodes, synchronization of two or more asynchronous events within the process is represented by join nodes, repetitive functions within the process are represented as repetition nodes; traversing the graphical representation of the process; generating computer code to represent functions and execution flow within the process, where the computer code is executable on a computer system.

The invention includes numerous advantages. One advantage is that the process modeling tool enables a user to define a business processes using simplistic process flow techniques. The code generation portion of the tool takes advantage of the object orientation of the underlying run-time infrastructure. Simplistic process flow visual notations have been extended to model some of the capabilities of the underlying infrastructure to enable users to accurately represent the run-time characteristics of a business process (for example, "splits" to allow parallelization and "joins" for synchronizing events). This lets users represent complex processes without having to write complicated object oriented programming code. The modeling tool provides a way to bridge the gap between the power of object oriented infrastructure and the simplicity of process models to represent business logic. Hereto before, users had to use either complex object oriented modeling techniques or use simplistic process modeling tools which would generate (run on) inefficient code (infrastructure).

BRIEF DESCRIPTION OF THE DRAWINGS

FIG. 4 shows an action node according to the invention.

FIG. 5A shows an event link according to the invention.

FIG. 5B shows an independent event node according to the invention.

DETAILED DESCRIPTION

The preferred embodiment of the present invention may operate in the context of a collaboration architecture as disclosed in commonly owned U.S. patent application Ser. No. 08/780,593, titled "Modular Application Collaboration", which is hereby incorporated by reference. The preferred embodiment is used to design and model processes encompassed within collaborations as defined in the above-referenced application.

Figure 1A:
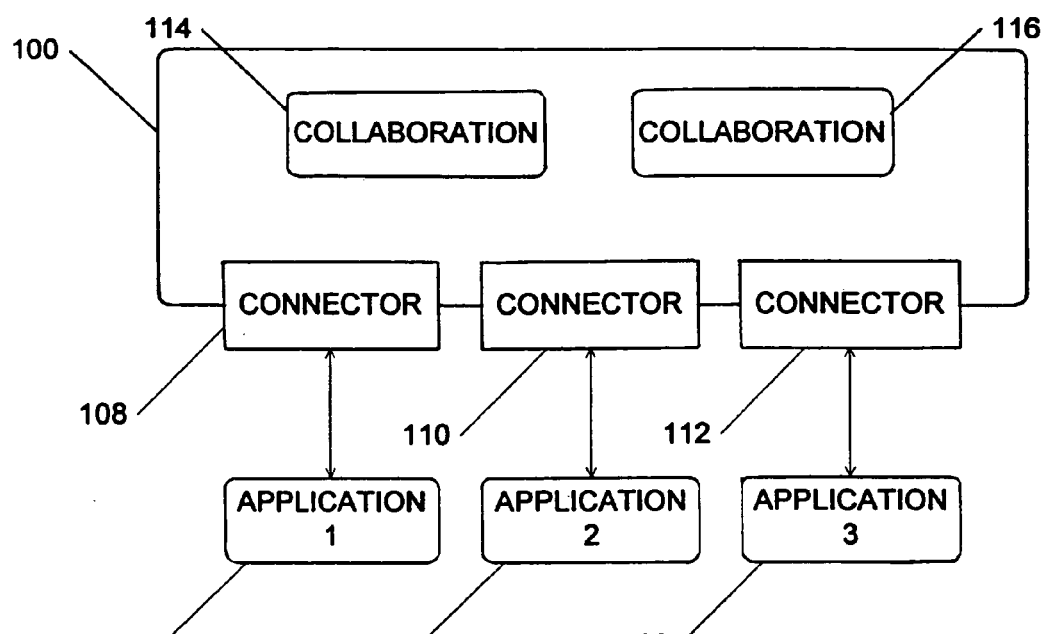
FIG. 1A shows a collaboration architecture according to the invention.

In general, the collaboration architecture supports the interaction of independent applications which would be incompatible and could not directly interact with one another on their own. An example of the structure of a collaboration architecture is shown in FIG. 1A. A collaboration architecture provides an interchange server 100 for interaction between independent applications 102, 104, 106. Interchange server 100 preferably operates between applications 102, 104, 106 where applications 102, 104, 106 are connected to interchange server 100 by corresponding connectors 108, 110, 112. Connectors 108, 110, 112 are associated with collaborations 114, 116 located within interchange server 100. Collaborations 114, 116 represent one or more processes. Each process is a transaction involving one or more of applications 102, 104, 106. Thus, collaborations 114, 116 serve as common meeting points for the interaction and exchange of data among applications 102, 104, 106.

For example, collaboration 114 may include a process which requires receiving data from application 102 and sending a portion of that data to application 104 in a different format. Application 102 sends data into connector 108. Connector 108 transforms the data into an interchange format object and publishes an event indicating the availability of the data. Collaboration 114 receives the object as a subscriber to that event. Collaboration 114 performs its process and generates an object to be sent to connector 110. Connector 110 transforms the object into an appropriate format and initiates an appropriate function in application 104. In this way, a process is accomplished which requires interaction from two applications 102, 104 which are independently incompatible.

Figure 1B:
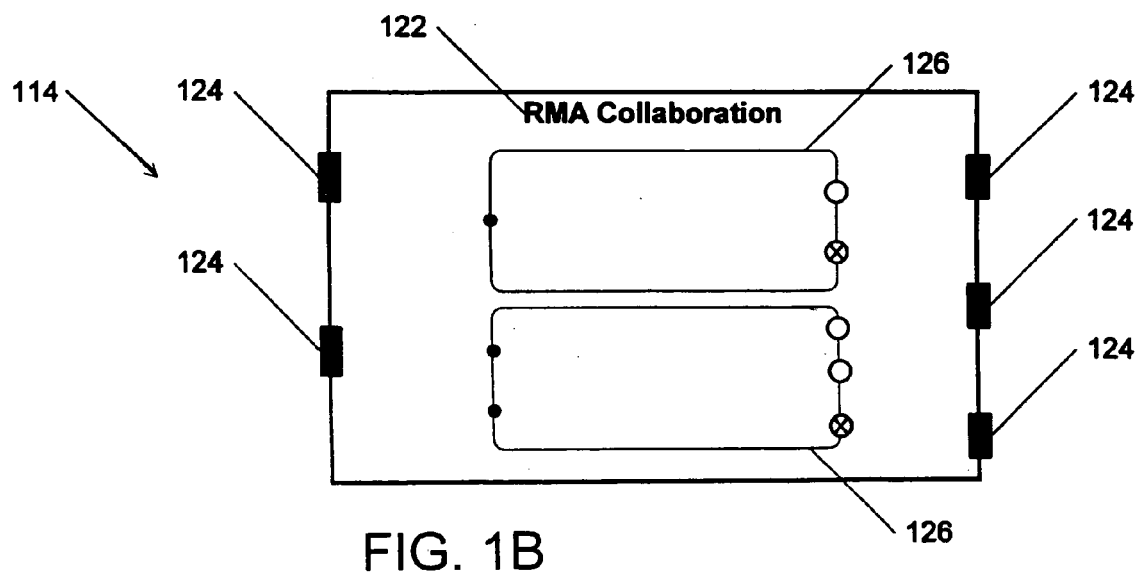
FIG. 1B shows a collaboration including two processes according to the invention.

A representation of a collaboration 114 is shown in FIG. 1B. Collaboration 114 includes a name 122, one or more roles 124, and one or more processes 126. A role 124 represents an abstraction of an object provided by an application associated with collaboration 114 (recall applications 102 and 104 associated with collaboration 114 in FIG. 1A). A role 124 may be provided by any object from an associated application which satisfies the abstraction of role 124, possibly requiring a specific object. Each process 126, as described above, represents a transaction involving one or more applications through objects represented by roles 124. Processes 126 accept starting events as inputs raised by roles 124. After completing the various actions which they perform, processes 126 generate events which are in turn passed to roles 124 for appropriate processing.

Graphical Representation

Figure 2:
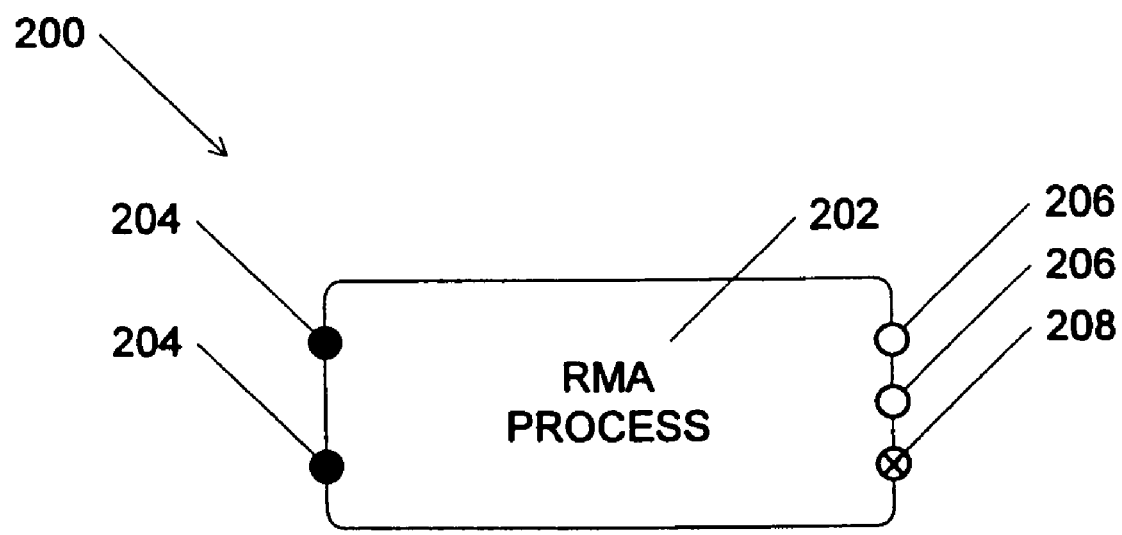
FIG. 2 shows a process node according to the invention.

The preferred embodiment provides a process modeling tool for graphically representing processes, such as processes 126 shown in collaboration 114 of FIG. 1B. At the top most level, a process is represented by a process node 200 as shown in FIG. 2. Each process node 200 has several characteristics, including: a name 202, a start node 204, a completion node 206 and an exception node 208. A process node 200 may have one or more start nodes 204, one or more completion nodes 206 and zero or more exception nodes 208. Each start node 204 represents an event which causes execution controlled by a process represented by process node 200 to begin. In the resulting code, execution begins when any one of the events connected to a start node 204 is detected. In this way, start nodes 204 operate in a logical OR sense. In the preferred embodiment, only one event is necessary to begin a process. During execution, if two events are raised which are coupled to two start nodes 204 which are connected to the same process node 200, an execution error may be raised. Alternately, the process represented by process node 200 may be executed twice in parallel or serially. Completion nodes 206 and exception node 208 represent events raised upon completing a process represented by a process node 200. This completion may be indicated by the generation of a single event associated with an appropriate completion node 206 or exception node 208. Ordinarily, only one such event is raised upon completion.

Figure 3:
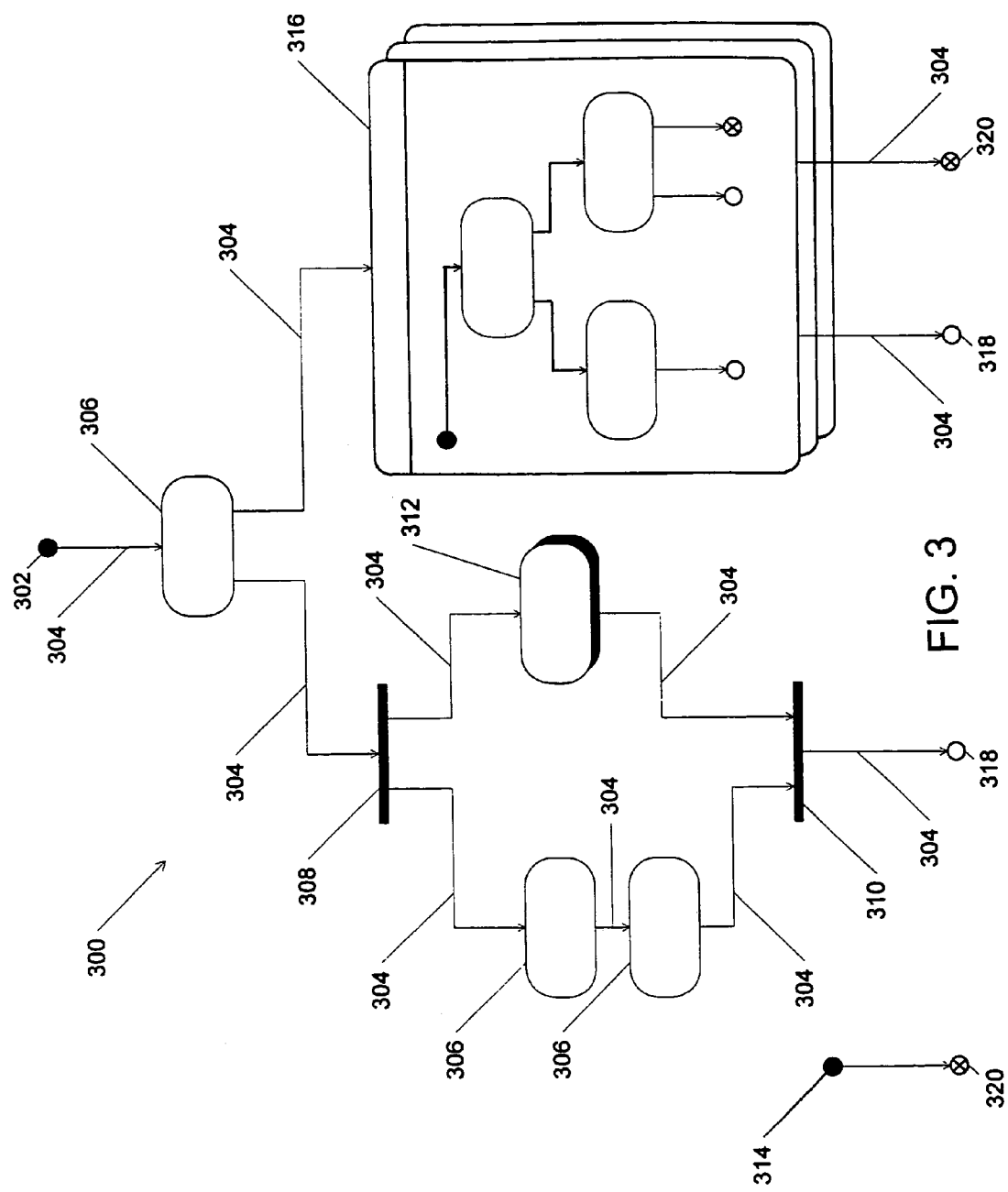
FIG. 3 shows an extended activity diagram according to the invention.

The internal operation of a process may be represented by an extended activity diagram. FIG. 3 provides an example of one such extended activity diagram 300. Extended activity diagram 300 contains various elements including a start node 302, event links 304, action nodes 306, a split node 308, a join node 310, a nested activity node 312, an independent event node 314, a repetition node 316, completion nodes 318, and exception nodes 320. Extended activity diagrams may also include swim lanes, synchronous message arcs, and asynchronous message arcs. These elements will be described in more detail below.

The graphical representation provided by the preferred embodiment includes extended activity diagrams which are extended in functionality relative to conventional activity diagrams. As described above, conventional activity diagrams typically do not provide representations for exceptions, independent events, repetitive actions, or compensating actions. The extended activity diagrams of the preferred embodiment are improved over conventional activity diagrams. Exceptions are represented by exception nodes, such as exception node 320 in FIG. 3. Independent events are represented by independent event nodes, such as independent event node 314 in FIG. 3. Repetitive actions are represented by repetition nodes, such as repetition node 316 in FIG. 3. In addition, compensating actions are provided through properties associated with action nodes, such as action node 306 in FIG. 3. In one embodiment, the compensating transactions may be stored in dialog marker boxes associated with a given node. The dialog boxes provide a placeholder for users to create and identify compensating transactions for individual actions defined by action nodes or other nodes in the activity diagram. Compensating actions may also be represented by exception nodes. The extended activity diagrams of the preferred embodiment also provides a representation for the interaction of roles associated with a collaboration. These features are described below with respect to the appropriate elements.

Start node 302 represents the beginning of execution of the process represented by extended activity diagram 300. The process begins upon raising the event represented by the event link 304 attached to start node 302.

Completion nodes 318 represent the successful completion of execution of the process. In contrast, exception nodes 320 represent the completion of execution of the process represented by extended activity diagram 300 with an exception. Exception nodes 320 provide an indication of non-successful completion of the process associated with extended activity diagram 300. In addition, exception nodes 320 may be used to include compensating actions in the representation of the process.

FIG. 4 shows an example of an action node 400 (recall action nodes 306 in FIG. 3). Action node 400 represents a function performed by the process. Action node 400 has characteristics including an identification number 402 and a name 404. The identification number 402 is used to distinguish one action node 400 from another within an extended activity diagram. The identification number 402 may be assigned by the modeling tool, or, in an alternative embodiment, may be established by a user or an outside process. The name 404 is used to provide a descriptive representation of the function performed by an action node for the graphical representation. Each action node 400 has associated with it a code fragment, described below. Action node 400 may also have an associated compensating action property to "undo" the effect of functions represented by action node 400. The compensating action may be stored in dialog box (not shown) which may be displayed along with the action node.

FIG. 5A shows an example of an event link 500 (recall event links 304 in FIG. 3). Event link 500 represents the occurrence or detection of a particular event during the execution of a process. Event link 500 may include a label 502. Label 502 for event link 500 may include an event name 504, one or more arguments 506, and a conditional statement 508. Event name 504 is a description of the event represented by event link 500. Argument 506 provides information describing the event. Conditional statement 508 is a predicate which must be satisfied for the event to be raised. The context of the event represented by event link 500 may be understood from the location of event link 500 in an extended activity diagram (such as extended activity diagram 300 in FIG. 3) and is further explained by label 502. For example, an event link may represent an event raised on completion of a function by an action node when shown as outgoing from the action node. Event links 500, similar to action node 400 shown in FIG. 4, each have an associated code fragment, described below.

An additional form of event link is an independent event node 510 shown in FIG. 5B (recall independent event node 314 in FIG. 3). Independent event node 510 represents an event that is not a completion event for a function associated with an action node nor some other event that is represented as an outgoing event link. Independent event node 510 includes a node 512 for visual distinction. In other respects independent event node 510 is similar to that of event link 500 of FIG. 5A. Independent event node 510 may include a label 514, a name 516, arguments 518, and a conditional statement 520, as well as a code fragment, described below.

The independent event node (such as independent event node 510 in FIG. 5B) represents an event which may arise independently of completion of the function of a particular action node. For example, certain exceptions which are generated on a system level as opposed to a process level may create a failure which requires a response and is independent from any functions being performed by action nodes within an extended activity diagram.

Figure 6:
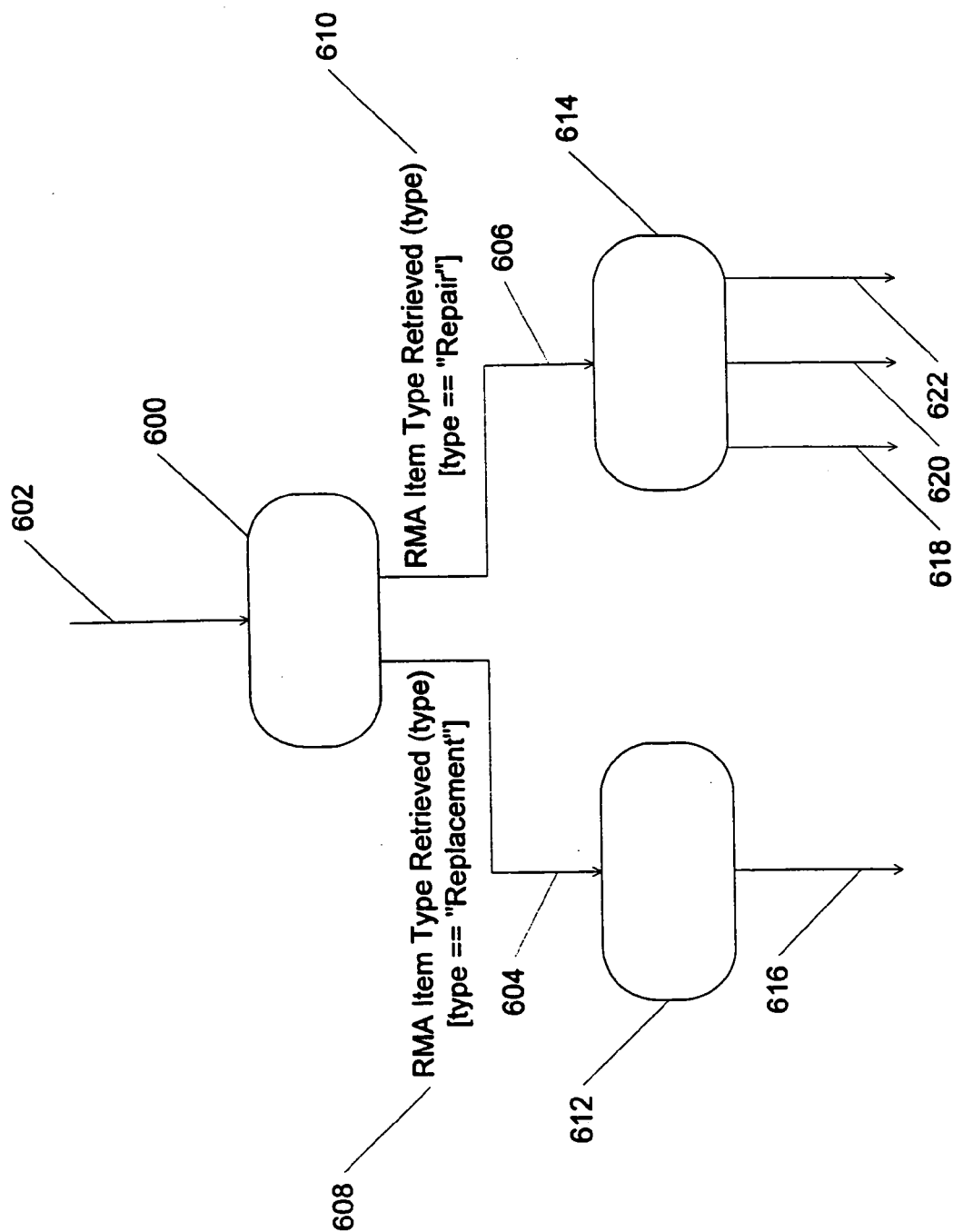
FIG. 6 illustrates action nodes and event links in combination according to the invention.

The interaction between action nodes and event links is further illustrated in FIG. 6. Action nodes may have one or more event links which are incoming event links and one or more event links which are outgoing event links. In FIG. 6, action node 600 has a single incoming event link 602. During the execution of a process represented by FIG. 6, when the event associated with event link 602 is raised and any condition associated with event link 602 has been fulfilled (recall conditional statement 508 of FIG. 5), the function associated with action node 600 begins execution. Action node 600 has two outgoing event links, 604 and 606. Upon completion of the function associated with action node 600, a single event will be generated by that function. This event is represented by one of outgoing event links 604, 606 associated with action node 600. This relationship is similar to that of the start nodes and completion nodes discussed above with respect to process nodes in FIG. 2.

For example, in FIG. 6, event link 604 includes a label 608 with a conditional statement which requires that argument "type" be equal to "Replacement". Event link 606 includes a label 610 with a conditional statement which requires that argument "type" be equal to "Repair". Accordingly, at execution when the function associated with action node 600 completes execution and raises an event, if the argument "type" equals "Replacement", the event associated with event link 604 is raised. If the argument "type" equals "Repair", the event associated with event link 606 is raised.

In the representation of FIG. 6, event link 604 is also an incoming event link for action node 612. Action node 612 has a single outgoing link 614. Event link 606 is an ingoing event link for action node 616 which has three outgoing event links 614, 616, 618. Similar to action node 600, upon completion of the function represented by action node 612, only one of outgoing events 614, 616, or 618 is raised.

The event driven nature of processes as represented in the process modeling tool of the preferred embodiment provides the ability to respond to any event when it is properly detected and the conditions associated with that event are satisfied. The interconnection of event links and action nodes is used to define relationships between completion of functionality and generation of events. The response to events is not limited to the semi-linear representation inherent in the flow depicted by event links and action nodes. Accordingly, when an event is raised, where the condition for that event has been fulfilled, execution within the process will proceed through that event. This may result in a "jump" within the links and nodes of an extended activity diagram from the perspective of an observer tracing the progress of the process through the elements of the extended activity diagram.

Figure 7:
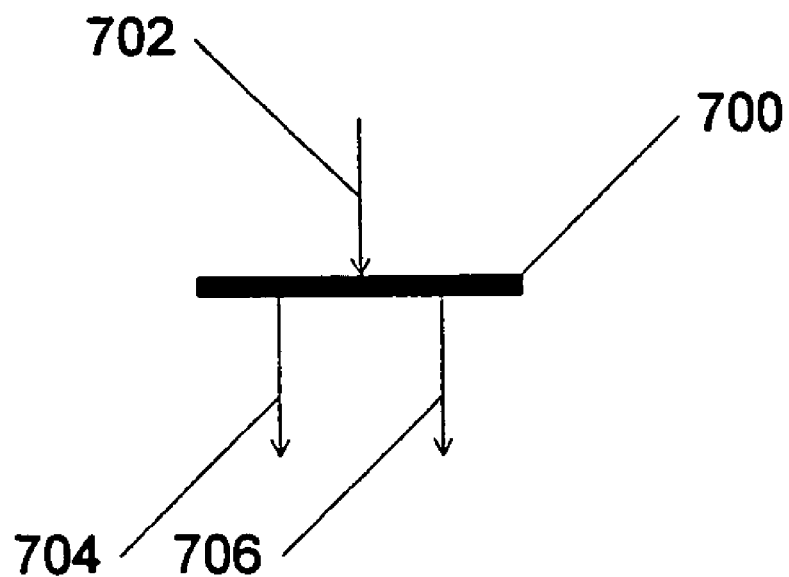
FIG. 7 shows a split node according to the invention.

FIG. 7 shows an example of a split node 700 (recall split node 308 in FIG. 3). A split node 700 includes a single incoming event link 702 and 2 or more outgoing event links 704, 706. During execution, when an event associated with event link 702 is raised, multiple events, represented in FIG. 7 by event links 704 and 706, are raised simultaneously in parallel. Accordingly, parallelism is introduced through the use of split nodes. Unlike events represented by outgoing event links of an action node (recall FIG. 6), outgoing event links of a split node are all raised when the incoming event link of the split node is raised.

The multiple outgoing event links of a split node represent independent events generated from a single event. The actual implementation of such parallelism depends upon the underlying hardware and software architecture which is used to operate the preferred embodiment. Examples of possible implementations include multiple processor systems, single processor systems employing threads or multi-tasking, or single processor systems which emulate multi-tasking through waiting periods.

Figure 8:
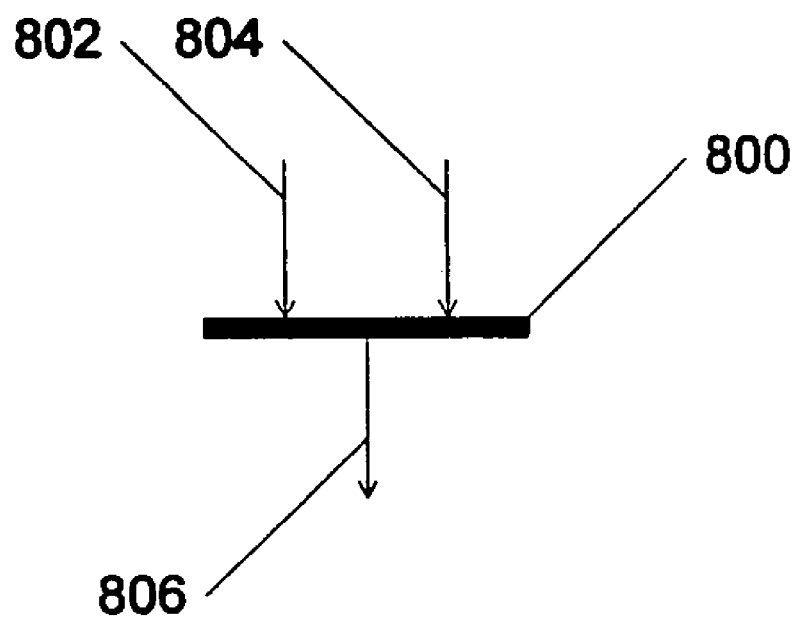
FIG. 8 shows a join node according to the invention.

FIG. 8 shows an example of a join node 800 (recall join node 310 in FIG. 3). At execution, join node 800 operates in a converse manner to a split node 700 as represented in FIG. 7. A join node 800 includes two or more incoming event links 802, 804, and a single outgoing event link 806. At execution, the event associated with outgoing event link 806 is not raised until all events associated with incoming event links 802, 804 have been raised. Join nodes allow for the processing of asynchronous events. A condition which depends upon two asynchronous events can advantageously be modeled by a join node.

The use of split and join nodes is restricted in the preferred embodiment. The events represented by incoming event links of a join node must be asynchronous or parallel events. The events must be independent. Having two event links flowing from a single action node into a join node is improper. A function associated with an action node raises only one of the events associated with that action node's outgoing event links. Similarly, because events associated with outgoing event links of a split node are raised in parallel, these events are preferably able to execute independently. Accordingly, the outgoing event links of a split node may not be connected to completion or exception nodes of a process or within a nested activity node (described below), unless the conditions associated with those event links are exclusive.

Figures 9A, 9B:
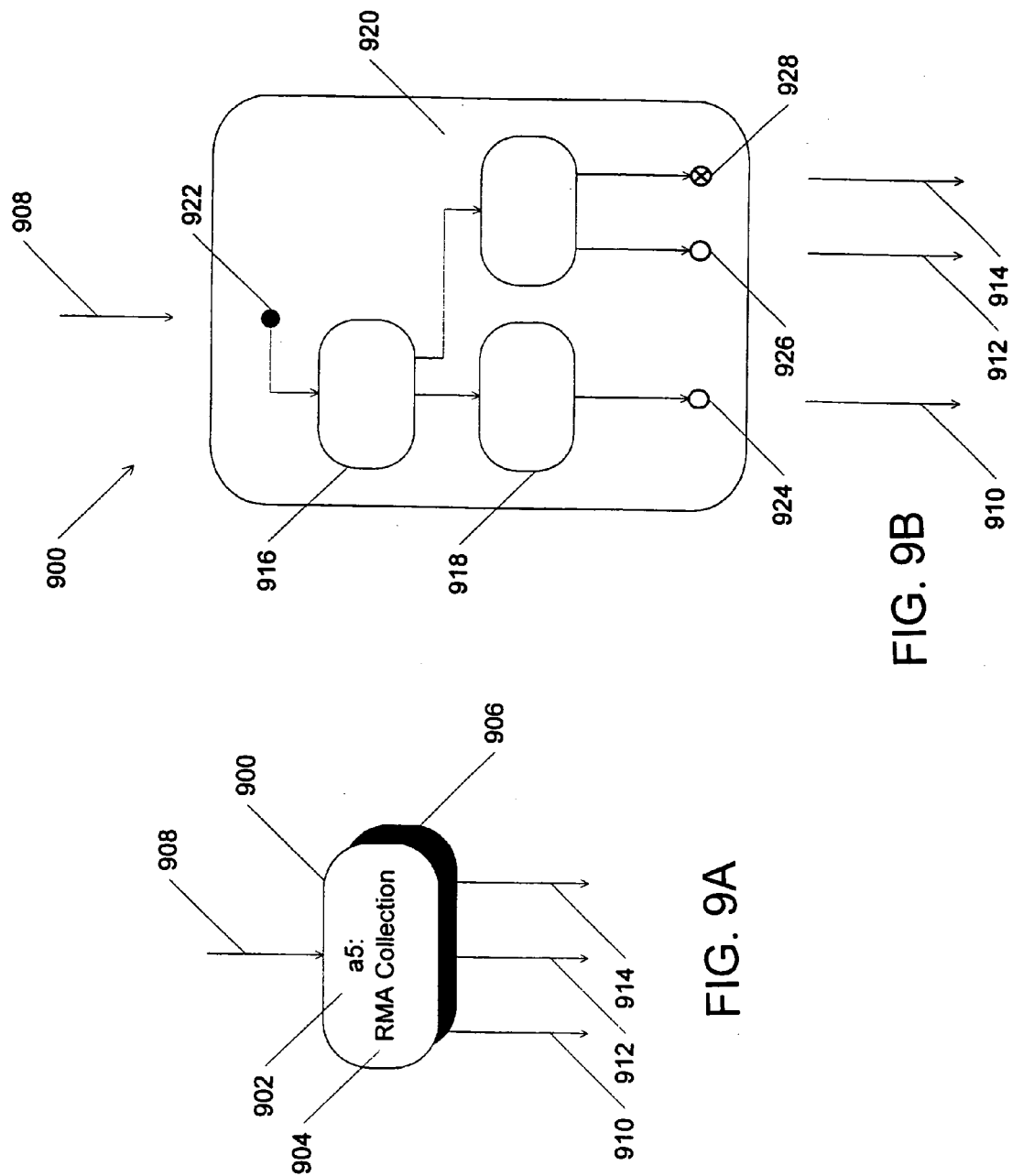
FIG. 9A shows a nested activity node according to the invention.
FIG. 9B shows a nested activity node and the nested activity node's internal components according to the invention.

FIG. 9A illustrates an example of a nested activity node used in extended activity diagrams (recall nested activity node 312 in FIG. 3). A nested activity node 900 is similar to action node 400 illustrated in FIG. 4. Nested activity node 900 includes an identification number 902 as well as a descriptive name 904. Nested activity node 900 also includes a shadow region 906. Shadow region 906 is used in the graphical representation to differentiate nested activity node 900 from action node 400 as shown in FIG. 4. Nested activity node 900 has associated with it one or more incoming event links 908 as well as one or more outgoing event links 910, 912, 914.

Nested activity node 900 is used to represent a series of functions in a modular way. That is, nested activity node 900 includes a group of one or more elements, such as action nodes, event links, further nested activity nodes, etc. A nested activity node provides a collapsible representation of a grouping of extended activity diagram components. This relationship is illustrated in FIG. 9B. For the purpose of example, nested activity node 900 may include three action nodes 916, 918, 920. Action node contained within a nested activity node are connected by event links as in other parts of the extended activity diagram. The operation of the internal components of a nested activity node is unchanged.

A distinguishing characteristic of nested activity node 900 as compared to action node 400 of FIG. 4 is that nested activity node 900 may also includes internal start nodes, internal completion nodes and internal exception nodes. The internal start nodes of a nested activity node represent and correspond to incoming event links of the nested activity node. As shown in FIG. 9B, a single event link 908 is provided to nested activity node 900 and is represented within nested activity node 900 by a single internal start node 922. Similarly, outgoing event links of a nested activity node correspond to internal completion nodes and internal exception nodes. As shown in FIG. 9B, nested activity node 900 has three outgoing event links 910, 912, and 914. In this example, these outgoing event links correspond to three internal nodes: two internal completion nodes, 924 and 926; and one internal exception node, 928.

Figure 10:
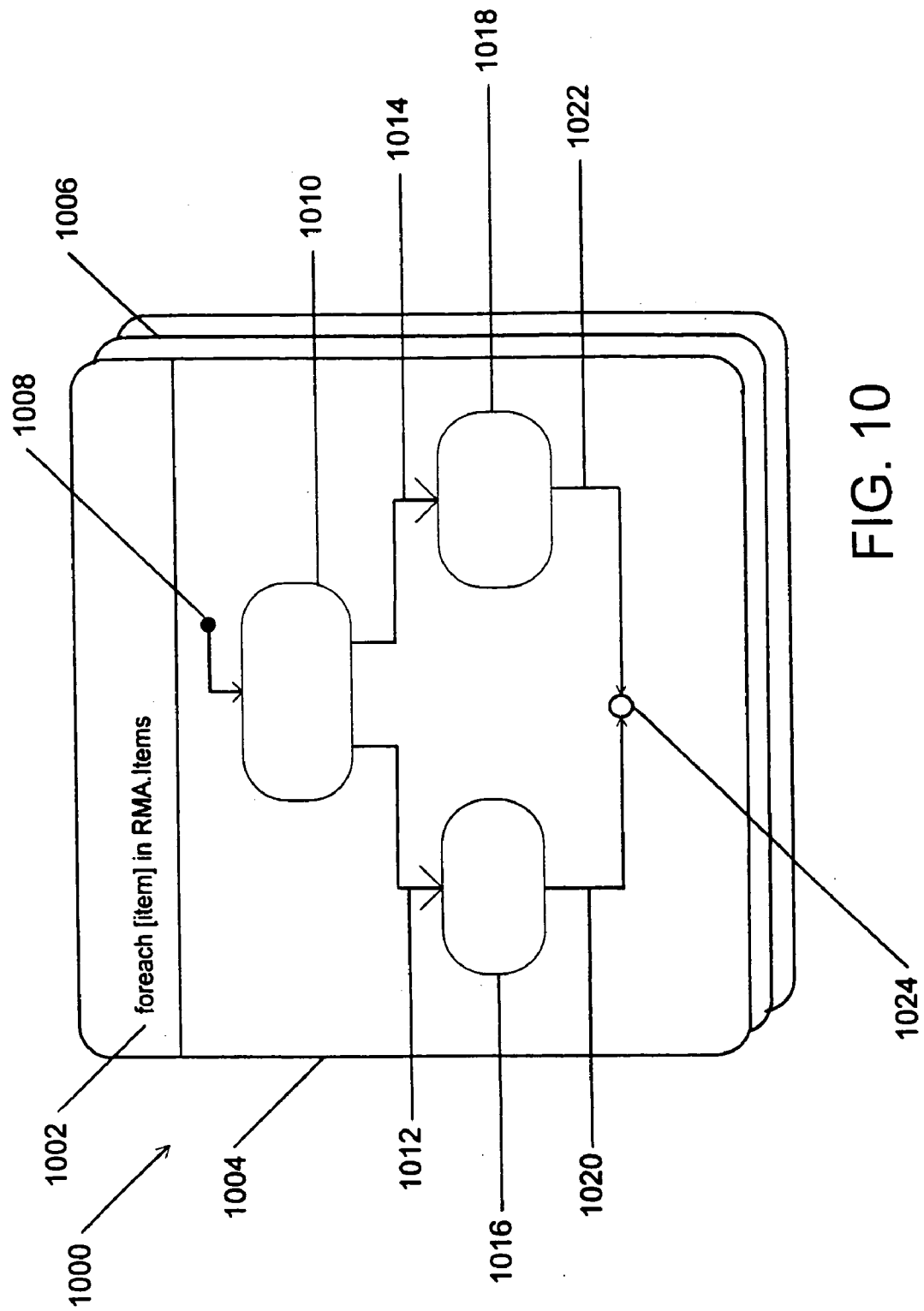
FIG. 10 shows a repetition node according to the invention.

An additional node that may be used in an extended activity diagram is a repetition node 1000 such as shown in FIG. 10 (recall repetition node 316 in FIG. 3). Repetition node 1000 includes a declaration section 1002 and a body 1004, as well as a multipage background region 1006. Multipage background region 1006 is similar to icons sometimes used in operating systems or word processing applications to represent a multi-page document. Repetition nodes in an extended activity diagram are used to represent looping functionality in the graphical representation. Typically, looping functionality is performed or provided in computer languages by statements such as FOR and WHILE.

At execution, the internal operation of body 1004 of repetition node 1000 is similar to the operation of the internal elements of nested activity node 900 as shown in FIGS. 9A and 9B. A difference in operation can be seen by the use of repetition start nodes and repetition complete nodes. In FIG. 10, body 1004 of repetition node 1000 includes a series of action nodes 1010, 1016, 1018 and event links 1012, 1014, 1020, 1022. A process executes implementing the functions and events in body 1004 does so in a similar manner as described above. Repetition is controlled by the contents of declaration 1002. For example, if declaration 1002 of repetition node 1000 indicates that body 1004 is to be executed three times, such as through a FOR or WHILE loop, execution begins at the top of body 1004 and proceed through body 1004 to the completion three times.

Body 1004 of repetition node 1000 as shown in FIG. 10 includes a repetition start node 1008 which represents an event which initiates the execution of a function associated with an action node 1010. Action node 1010 has two outgoing event links 1012 and 1014. Event link 1012 flows to an action node 1016 while event link 1014 flows to an action node 1018. Action nodes 1016, 1018 each have an outgoing event link 1020, 1022, respectively. Event links 1020, 1022 flow to a repetition completion node 1024. At execution, when an event represented by an event link 1020, 1022 connected to repetition completion node 1024 is raised, the content and operation of declaration 1002 is checked to determine whether the iterative execution associated with repetition node 1000 is complete or whether another iteration of the content of body 1004 is warranted. Upon completion, according to declaration 1002, an event associated with an outgoing event link is triggered similar to action nodes. Accordingly, repetition nodes 1000 in an extended activity diagram operate similarly to action nodes (recall action node 400 of FIG. 4) through the diagram, however, repetition nodes 1000 allow for multiply iterative functionality.

Figure 11:
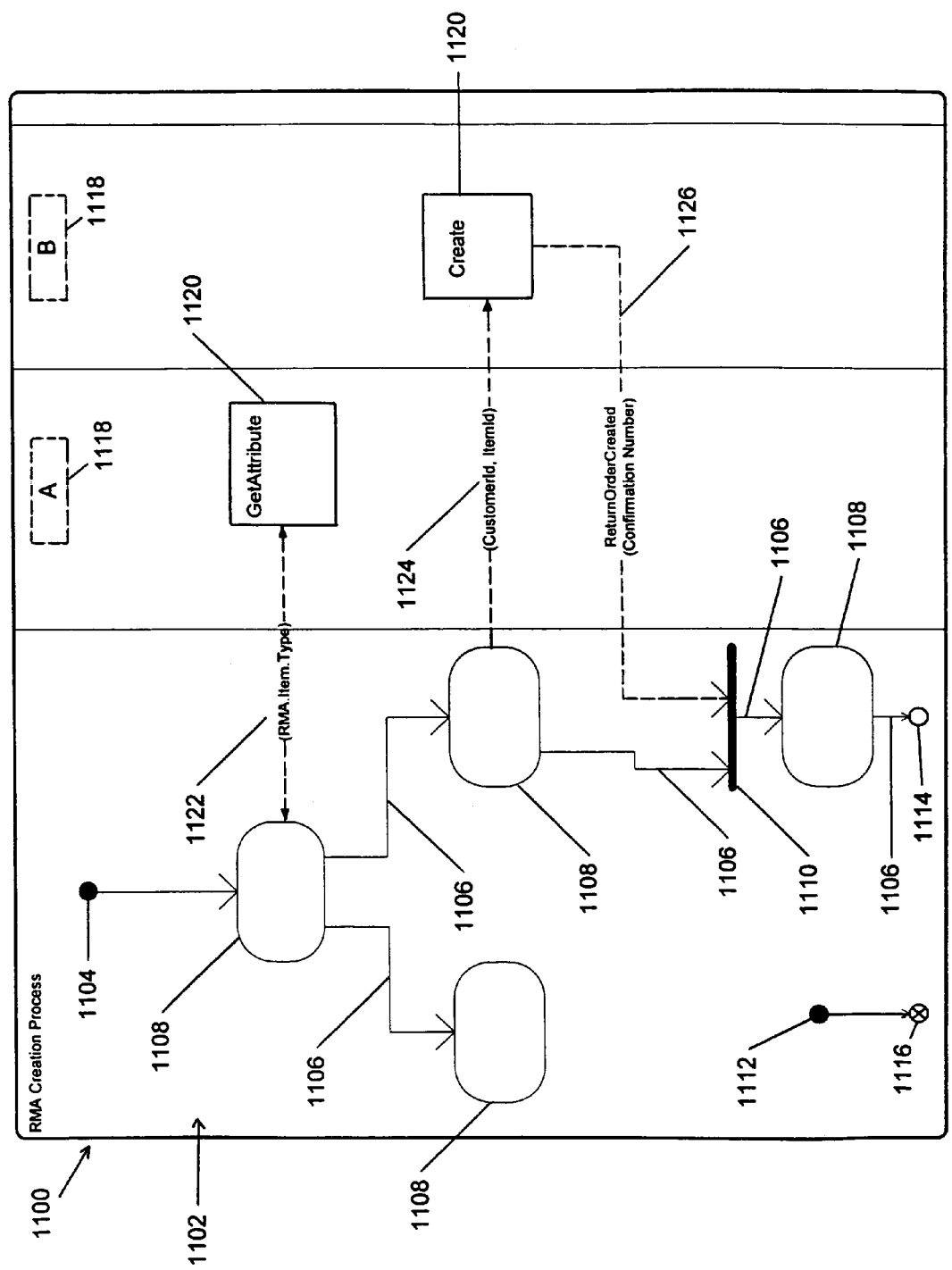
FIG. 11 shows a service activity diagram according to the invention.

FIG. 11 shows an example of a service activity diagram 1100. Service activity diagram 1100 is used to illustrate the interaction of a process and roles associated with the process. Service activity diagram 1100 includes an extended activity diagram 1102, similar to extended activity diagram 300 shown in FIG. 3. Extended activity diagram 1102 includes, as an example, a start node 1104, event links 1106, action nodes 1108, a join node 1110, an independent event node 1112, a completion node 1114, and an exception node 1116. The components of extended activity diagram 1102 are used in the same way as in other extended activity diagrams (such as extended activity diagram 300 in FIG. 3). Service activity diagram 1200 also includes, as an example, swim lanes 1118, service nodes 1120, a synchronous message arc 1122, an asynchronous message arc 1124, and a service event link 1126. These components will be described in turn below.

Figure 12:
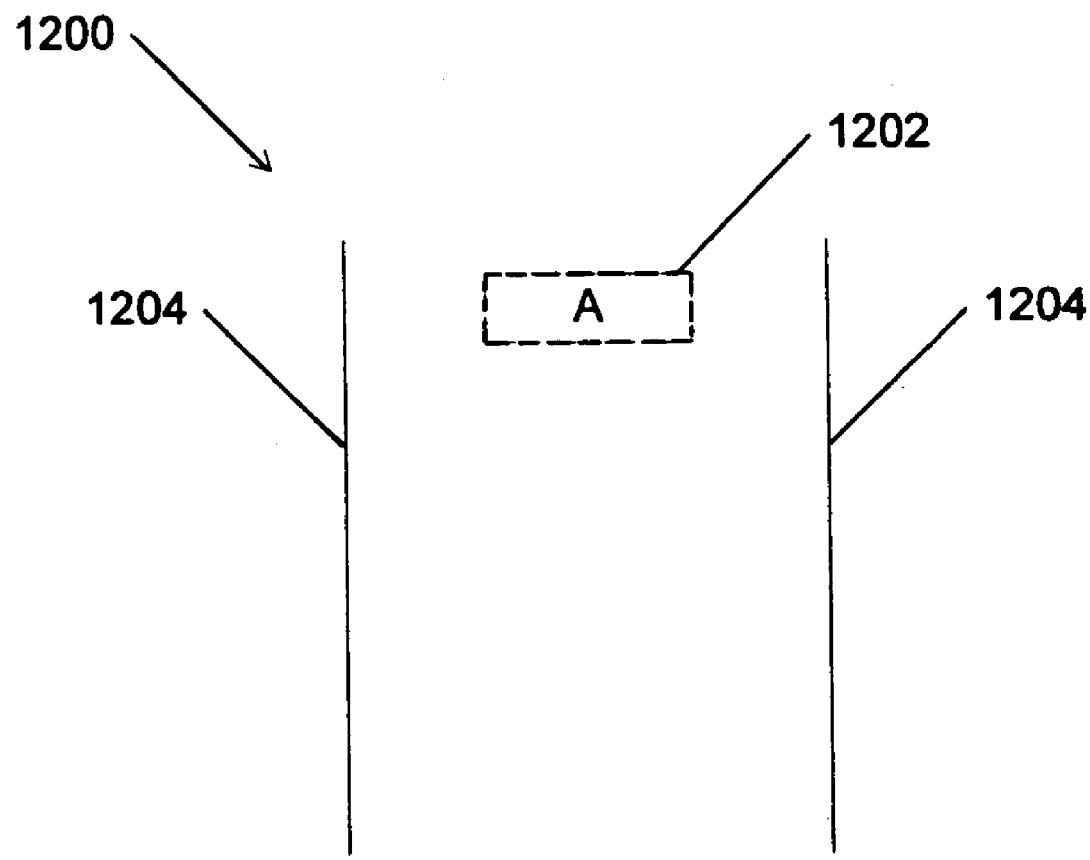
FIG. 12 shows a swim lane according to the invention.

FIG. 12 illustrates a swim lane 1200 (recall swim lanes 1118 in FIG. 11). Swim lane 1200 is used to represent a role (recall role 124 in FIG. 1B) associated with a collaboration (recall collaboration 114 in FIG. 1B). In a service activity diagram, swim lane 1200 is used to illustrate interaction between the process and roles. Swim lane 1200 includes a role label 1202 and lines 1204 defining swim lane 1200. Role label 1202 indicates which role is associated with swim lane 1200.

Swim lane 1200 preferably represents one role. There is not necessarily one swim lane 1200 for every role in a collaboration. Roles which provide information or provide services to functions within a process represented in a service activity diagram are represented in that service activity diagram by a swim lane 1200. Swim lanes may also be used in responsibility activity diagrams, described below with respect to FIG. 17.

Figure 13:
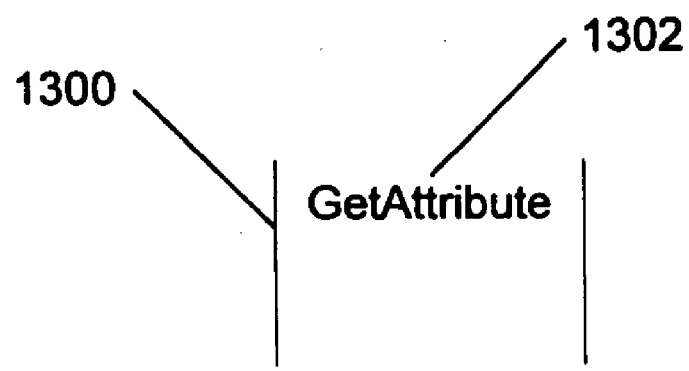
FIG. 13 shows a service node according to the invention.

FIG. 13 shows a service node 1300 (recall service nodes 1120 in FIG. 11). Service node 1300 represents a service request to a role. Where service node 1300 is used in a swim lane (such as service nodes 1120 in swim lanes 1118 in FIG. 11), service node 1300 represents a service request to a role represented by the swim lane. Service node 1300 includes a service label 1302 indicating a method to be invoked by the role associated with the given swim lane containing service node 1300 in response to the service request.

Figure 14:
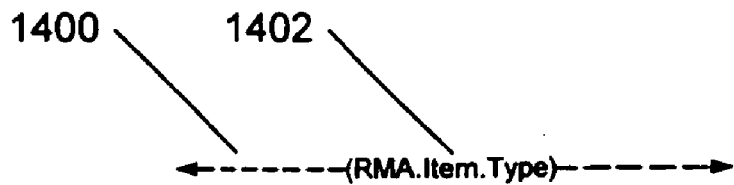
FIG. 14 shows an asynchronous message arc according to the invention.

FIG. 14 shows a synchronous message arc 1400 (recall synchronous message arc 1122 in FIG. 11). Synchronous message arc 1400 represents a service request by the process to a role. A label 1402 indicates the arguments of the request by the process. Synchronous message arc 1400 is used to request information from a role associated with a process through the collaboration. Synchronous message arc 1400 preferably connects an action node and a service node (recall FIG. 11). The request for information by a function represented by an action node to a role represented by a swim lane where the execution of the function does not proceed until a response has been received from the role is represented by synchronous message arc 1400. The activity between the function and the role are synchronous because the function does not proceed without the role's response.

Figure 15:
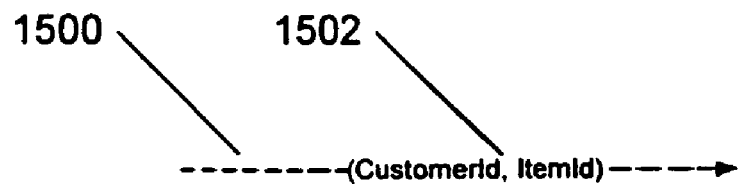
FIG. 15 shows a synchronous message arc according to the invention.

FIG. 15 shows an asynchronous message arc 1500 (recall asynchronous message arc 1124 in FIG. 11). Asynchronous message arc 1500 represents a service request by the process to a role. A label 1502 indicates the arguments of the request by the process. Asynchronous message arc 1500 is used to request information or an action from a role associated with a process through the collaboration. Asynchronous message arc 1500 preferably connects an action node and a service node (recall FIG. 11). The request for information or action by a function represented by an action node to a role represented by a swim lane where the execution of the function proceeds without waiting for a response from the role is represented by asynchronous message arc 1400. The activity between the function and the role are asynchronous because the function does not wait for the role's response.

Figure 16:
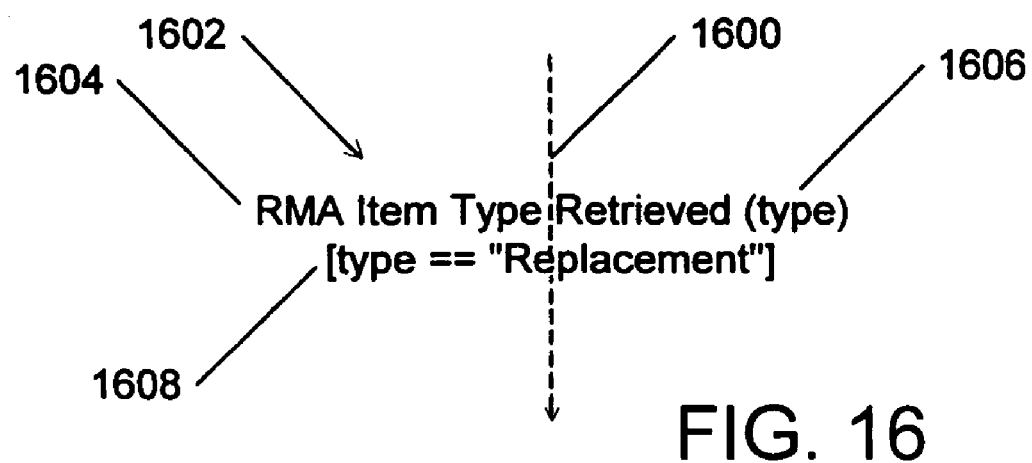
FIG. 16 shows a service event link according to the invention.

FIG. 16 shows a service event link 1600 (recall service event link 1126 in FIG. 11). Service event link 1600 represents an event raised by a role represented by a swim lane. Service event link 1600 may include a label 1602. Label 1602 for event link 1600 may include an event name 1604, one or more arguments 1606, and a conditional statement 1608. Service event link 1600 is otherwise similar to event link 500 of FIG. 5, but is preferably represented as a dotted line for visual distinction.

Accordingly, roles associated with a collaboration send and receive messages, typically in the form of message calls or message indications, represented by synchronous and asynchronous message arcs. Roles also raise events which are received within the process represented in an extended activity diagram, represented by service event links.

Figure 17:
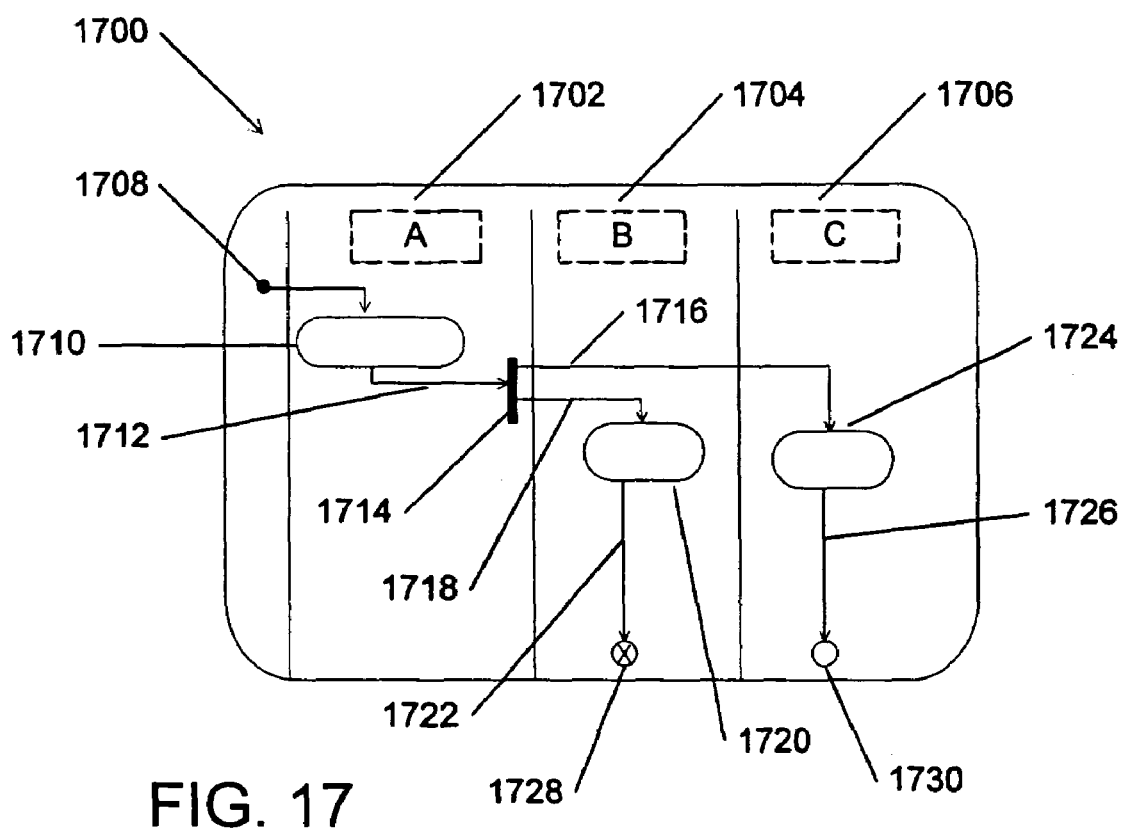
FIG. 17 shows a responsibility activity diagram according to the invention.

FIG. 17 illustrates an example of a responsibility activity diagram 1700. Responsibility activity diagram 1700 is used to indicate which roles associated with a collaboration are responsible for functions represented by action nodes throughout an extended activity diagram. Responsibility activity diagram 1700 contains an extended activity diagram which is oriented generally horizontally. Swim lanes 1702, 1704, 1706 each represent a single role (recall swim lane 1200 in FIG. 12). Those elements of the extended activity diagram which are within a swim lane 1702, 1704, 1706 are the responsibility of the role represented by that swim lane.

For example, the process represented by responsibility activity diagram 1700 begins with a start event represented by a start node 1708. At execution, the function associated with action node 1710 raises an event represented by event link 1712 on completion. Event link 1712 is an incoming event link for a split node 1714. Action node 1710 includes a function which is handled by the role associated with swim lane 1702. The event represented by event link 1712 raises two asynchronous parallel events represented by event links 1716 and 1718. This parallel event generation is represented by split node 1714 (recall the discussion above with respect to split nodes and FIG. 7).

Event link 1716 flows to an action node 1724 in swim lane 1706 representing an action to be handled by the role associated with swim lane 1706. Event link 1718 flows to an action node 1720 in swim lane 1704. The events represented by event links 1716 and 1718 occur in parallel and independently and so the execution of the functions associated with action nodes 1720 and 1724 also occurs independently. The function associated with action node 1720 raises an event upon completion, represented by event link 1722 which flows to an exception node 1728. The function associated with action node 1724 raises an event upon completion, represented by event link 1726, which flows to a completion node 1730. As these functions are being executed in parallel, the events represented by event links 1722 and 1726 are also parallel. However, as discussed above, a process represented by an extended activity diagram preferably only raises one event on completion. Accordingly, the events associated with event links 1722 and 1726 may not both be raised. One way to prevent improper event conflicts is to use exclusive conditional statements for event links 1722 and 1726 (recall the discussion with respect to FIG. 5 and event links). For example, if the event associated with event link 1722 included the condition that DISK SPACE equals FULL, while the event associated with event link 1726 included the condition that DISK SPACE does not equal FULL, these events may not both be raised in parallel due to the exclusive nature of their conditions.

The graphical representation of the process modeling tool provides display and editing functionality for the composition of extended activity diagrams to model processes in collaborations.

Code Generation

The process modeling tool in its preferred embodiment also provides generation of usable executable code based in part upon the graphical representation described above. The code generation of the process modeling tool derives from the association of code fragments with action nodes and event links as well as other elements throughout extended activity diagrams.

In the preferred embodiment, code fragments are supplied by a user. The user enters code fragments and associates those code fragments with elements of an extended activity diagram while creating a graphical representation, as described above. Alternately, code fragments may be at least partially supplied in files or libraries, or contained in the process modeling tool itself.

Action node code fragments are associated with action nodes. Accordingly, each action node within an extended activity diagram has associated with it a code fragment. A code fragment does not necessarily represent a single function executed in terms of a single line of code in a typical programming language. Code fragments may include one or more functions which are grouped together in such a way as to indicate that the generation of further events is not necessary or desirable.

In the preferred embodiment, within a code fragment associated with a single action node only one role access is made. A role access includes accessing the services provided by a given object represented by a role within the collaboration. However, multiple service requests may not be made from a single action node. To request services from multiple objects, multiple action nodes are used in the preferred embodiment. These multiple action nodes may then be grouped into a single nested activity node.

In the preferred embodiment, action node code fragments include a sequence of one or more Java statements. Typical examples include: local variable declarations, requests for an attribute value, setting attribute values to arithmetic expressions or constants, creation of a new object of a specified type, and invoking an operation on an object. Object manipulations may be performed on objects local to code fragments or may be made as service requests, in lieu of a graphical representation of the request as a message arc. Code fragments for action nodes may also include run-time Java callable directives to access meta-data about the roles or access run-time services.

Event link code fragments are code fragments associated with an event link. The code fragments associated with event links are meant to express an event. Typically event link code fragments include one or more of: an event name, zero or more event arguments, and a condition over the event arguments. The event link code fragment is a code equivalent of the label as described above with respect to FIG. 5. All event link code fragments are only conditional. Accordingly, such code fragments may not include assignment statements, or other statements which create or alter data. Event link code fragments may involve a request for information from objects, however such information may not be stored in the sense that assignments are made in action node code fragments.

In the preferred embodiment, the condition contained within the event link code fragment is typically a Java conditional expression limited to the accessible scope and name space of the process. Additionally, the following types of Java callable predicates are allowed in the conditional expression as conjunct (AND), disjunct (OR), or negative (NOT): the quality of two business objects, the quality of two business objects in terms of all attribute values, the characteristic of an attribute or key, whether an attribute is null or blank, or whether an attribute exists for a particular object.

An additional form of code implemented or implicitly implemented in the graphical representation provided by the process modeling tool is code associated with repetition nodes, split notes, and join nodes. The declaration of repetition nodes provides the requirements, possibly in a pseudo-code format, which control the execution of the repetition node body as explained above with reference to FIG. 10. Split nodes and join nodes generate code that is not defined explicitly in the way that code fragments for action nodes or event links are defined. Instead, the code for split and join nodes may be contained within libraries accessed by the process modeling tool or coded directly into the body of the process modeling tool itself.

The generation of code in the process modeling tool may be handled by a semantic engine in the preferred embodiment. The semantic engine provides semantics of the graphical elements displayed and manipulated in the graphical representation described above. The semantic engine maintains a representation of models that are currently being worked on by loading and saving the models from and to a repository. The repository is a section of memory or storage used to maintain records of objects, near associated attributes and graphical elements within the graphical representation of the process modeling tool.

For every element, whether an action node or some other kind of node, the semantic engine maintains semantic properties for that element (e.g., description, starting and completion events, any messages which might be sent, etc.) as a semantic entity. The graphical representation components within the process modeling tool maintain multiple views on semantic entities through the process modeling tool. A view is a representation used by the process modeling tool to interact between data storage and the graphical representation components. A semantic entity and its views maintain an observed/observer relationship, in the sense that views observe the properties of semantic entities and update whenever the observed entity changes.

Elements in models are kept consistent according to semantic constraints. An example of a semantic constraint is the relationship between a message and the interface of the recipient object; namely, a message may be required to match the message signature in the interface. Such interfaces are maintained through the repository.

The generation of code by the process modeling tool may be performed in a variety of manners such as the parsing used in conventional compilers, a step through approach proceeding down each link through the graphical representations, or any of a number of alternative approaches which will be apparent to one of ordinary skill in the art. The code generator of the preferred embodiment may traverse the extended activity diagram as a tree according to a predefined manner. For example, the traversal may begin at the topmost node (relative to the vertical graphical representation) and traverse the elements of the diagram through event links, following links to the left side first. As the code generator traverses the extended activity diagram, code fragments are stored for elements as well as information necessary to reproduce the process flow depicted by the interconnection of elements in the extended activity diagram, such as the connection of event links to action nodes.

In the preferred embodiment the generated code has an event loop architecture. An event loop is used to represent the event driven nature of the executable code and process represented by the extended activity diagram. Event loop architectures are typically characterized by a queue of events and an iterative loop with a section of code for each recognized event. In the preferred embodiment, each node of the extended activity diagram is an alternative in a disjunctive tree (e.g., case statements in a switch statement). The body of each alternative is formed from the associated node's code fragment (such as for a user-defined action node) or inherent code (such as for a split or join node). Event link code fragments are used to form exit conditions for the alternative and determine what event is raised on completion of the code fragment in the alternative. Additional alternatives and code are generated to represent the asynchronous occurrence of events (such as from independent event nodes). A first-in-first-out ("FIFO") data structure (such as a queue) is used to determine which action node of the extended activity diagram is to be executed next. An example illustrating code generated by a process modeling tool of the preferred embodiment is shown in Appendix A below.

Figure 18A:
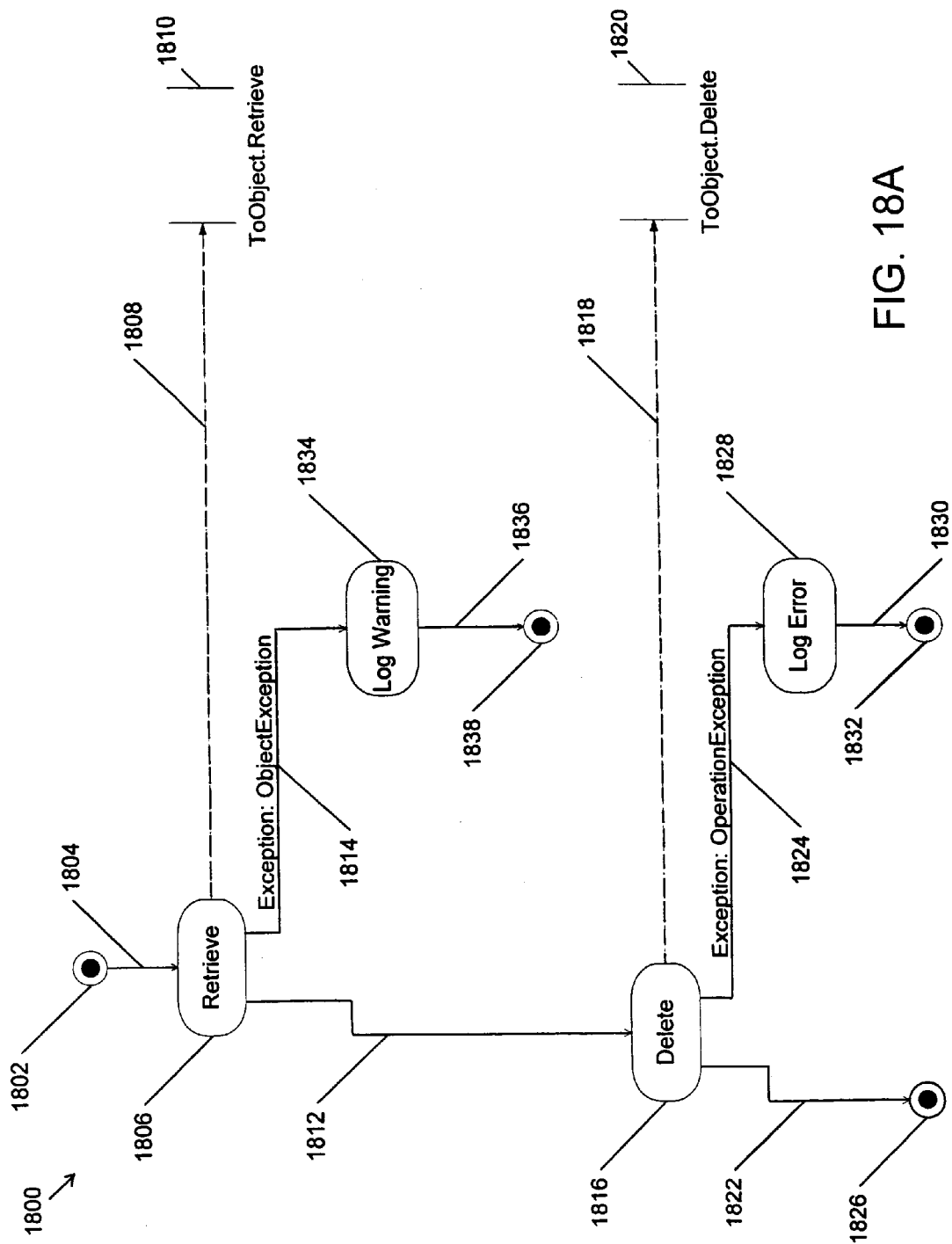
FIG. 18A shows an extended activity diagram according to the invention.

FIG. 18A shows an example of an extended activity diagram 1800 including role accesses in a graphical representation of one embodiment. Extended activity diagram 1800 includes a start node 1802. Start node 1802 has an outgoing event link 1804 connecting to an action node 1806. Action node 1806 is labeled "Retrieve". Action node 1806 has an outgoing asynchronous message arc 1808 to a service node 1810. Service node 1810 is labeled "ToObject.Retrieve" indicating a message "Retrieve" is sent to an object "ToObject".

Action node 1806 has two outgoing event links 1812, 1814. Event link 1814 is labeled "Exception: ObjectException" indicating the event associated with event link 1814 is an exception. Event link 1812 enters an action node 1816. Action node 1816 is labeled "Delete". Action node 1816 has an outgoing asynchronous message arc 1818 to a service node 1820. Service node 1820 is labeled "FromObjectBusObj.Delete" indicating a message "Delete" is sent to an object "FromObjectBusObj".

Action node 1816 has two outgoing event links 1822, 1824. Event link 1824 is labeled "Exception: OperationException" indicating the event associated with event link 1814 is an exception. Event link 1822 enters a completion node 1824. Event link 1824 enters an action node 1828. Action node 1828 is labeled "Log Error". Action node 1828 has a single outgoing event link 1830 which enters a completion node 1832.

Event link 1814 enters an action node 1834. Action node 1834 is labeled "Log Warning". Action node 1834 has a single outgoing event link 1836 which enters a completion node 1838.

Accordingly extended activity diagram 1800 graphically represents a process which retrieves information from an object and deletes that information. If an error occurs during retrieval or deletion, an exception is raised.

Figure 18B:
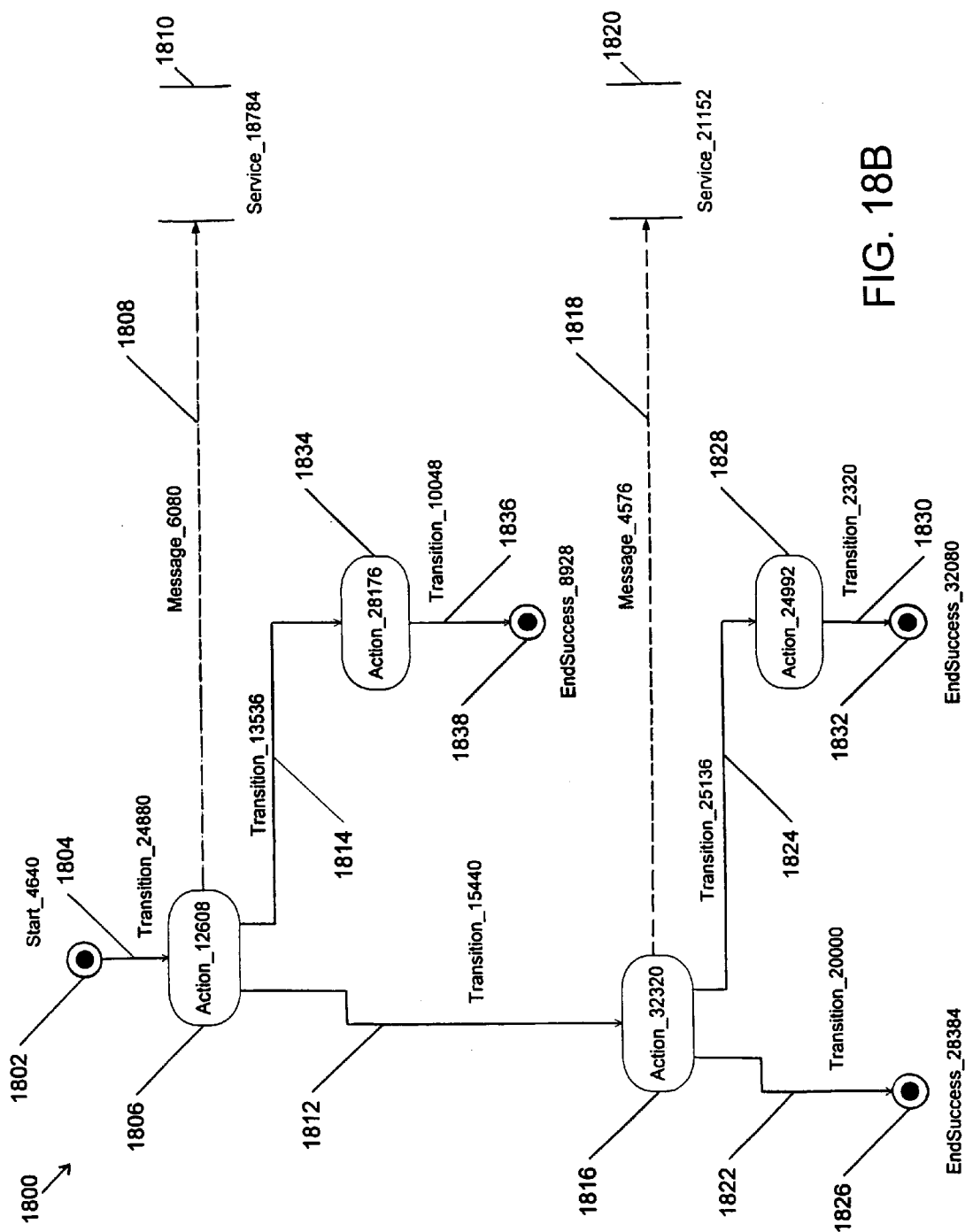
FIG. 18B shows an extended activity diagram according to the invention.

FIG. 18B shows extended activity diagram 1800 with different labels. The labels in FIG. 18B are identifiers used for code generation. Thus, action node 1806 is labeled "Retrieve" in FIG. 18A and labeled "Action_12608" in FIG. 18B. Each element in FIG. 18B has an identifier. The identifiers may be generated automatically by the process modeling tool. Alternately, identifiers may be supplied by the user.

An example of code generated by the preferred embodiment based on extended activity diagram 1800 is described below and shown in full in Appendix A. Appendix A includes 7 pages A–1 through A–7 and is expressly incorporated herein by reference. Comments, i.e., non-executable code indicated by leading "//" marks, are interspersed throughout the code for explanatory purposes. These comments are preferably generated automatically by the code generator.

The first few sections of code are generated to define an operating context for the process, such as "import" statements and a SyncManager class declaration:

```
package UserCollaborations;
...
public BusObj executeScenario(String scenarioName,
BusObj triggering BusObj) throws CollaborationException
...
}
```

A scenario is defined named "scenario_Delete":

public BusObj scenario_Delete(BusObj triggeringBusObj)

throws CollaborationException

This scenario contains the executable code directly corresponding to the elements shown in extended activity diagram 1800 in FIGS. 18A and 18B. A "while" loop is generated as an event loop:

while (true)

The while loop contains a "switch" statement which receives an indicator for which function represented by a node is next:

switch(_currCC.nextNode)

The switch statement contains a "case" statement for each node in extended activity diagram 1800 (except for service nodes 1810, 1820 because a function of a service node is handled by the role associated with the service node):

case 4640:

. . .

case 12608:

. . .

As shown in FIG. 18B, start node 1802 has an identifier of "Start_4640". Thus "case 4640" corresponds to start node 1802. Similarly, "case 12608" corresponds to action node 1806 which has an identifier of "Action_12608". In addition, the comments in the code help explain these correlations. For example, immediately before "case 4640" is a comment "// Start node", showing a reader that "case 4640" corresponds to a start node.

Code fragments supplied by the user are included by the code generator in case statements corresponding to the appropriate action node. In "case 12608" the code fragment is surrounded by comments for clarity:

```
//**+**+** gencode marker: begin CODE
//    SyncManager:Delete:Action_12608.
FromObjectBusObj.set(triggeringBusObj);
ToObjectBusObj.set(triggeringBusObj);
//**+**+** gencode marker: end CODE
//    SyncManager:Delete:Action_12608.
```

Thus, the user supplied "FromObjectBusObj.set(triggeringBusObj); ToObjectBusObj.set(triggeringBusObj);". The code generator generated the comments and placed the user supplied code fragment in the appropriate place in the code, i.e., in "case 12608".

"case 12608" also includes code for asynchronous message arc 1808 to service node 1810:

```
//**+**+** gencode marker: begin SERVICE-PORT
//    SyncManager:Delete:Action_12608.
_currCC.internalState =
    ContinuationContext.REQUEST_COMPLETED;
send("ToObject", ToObjectBusObj, "Retrieve", _currCC);
continue;
//**+**+** gencode marker: end SERVICE-PORT
//    SyncManager:Delete:Action_12608.
```

Similar to the code fragments discussed above, the code generator generates comments surrounding the service request. However, the service request code ("_currCC.internalState= ContinuationContext.REQUEST_COMPLETED; send ("ToObject", ToObjectBusObj, "Retrieve", _currCC); continue;") is also generated by the code generator, not supplied by the user. The code generator uses the labels supplied in the graphical representation and the context of the associated message arc to generate the executable code for the service request.

Event links in extended activity diagram 1800 do not generate case statements. Instead, event links generate variables and conditional statements at the end of a case statement to determine which node is next for the next iteration of the while loop. In "case 12608" event link 1812 results in:

```
//**+**+** gencode marker: begin BRANCH
//    SyncManager:Delete:Transition_15440.
_b1 = (true);
//**+**+** gencode marker: end BRANCH
//    SyncManager:Delete:Transition_15440.
...
if (_b1)
enqueueCC(new ContinuationContext(32320,
    _currCC.nextNode, -1));
```

Thus, action node 1806 (identifier "Action_12608") has an outgoing event link 1812 (identifier "Transition_15440") which enters action node 1816 (identifier "Action_32320").

An event link associated with an exception, such as event link 1814, is treated differently from other event links.

Depending upon the type of the exception, different code is generated by the code generator. Event link 1814 is associated with an exception and enters action node 1834 (identifier "Action__28176"):

```
if (_exceptionType.equals("ObjectException"))
{
    _enqueueCC(new ContinuationContext (28176,
        _currCC.nextNode, -1));
    continue;
}
```

Additional code is generated to process other exceptions which may occur, possibly resulting in termination of execution:

```
catch(Exception e)
{
    _executionPathCount -= _killAllCCofSameParent (-1);
    throw new CollaborationException(JavaException,
        e.toString( ));
}
// Count how many branching conditions are true.
int trueCounter = 0;
if (_b1) trueCounter++;
// Validate only one branching condition is true.
if (trueCounter > 1)
    throw new CollaborationException
        (TransitionException, "More than one branch
        conditions are evaluated to true.");
if (trueCounter < 1)
    throw new CollaborationException
        (TransitionException, "Less than one branch
        condition is evaluated to true.");
```

The remaining elements in extended activity diagram 1800 are processed in a similar manner to generate the case statements shown in the example. The elements are processed by following event links to the left first. Thus, the case statements in the example are in the order of start node 1802, action node 1806, action node 1816, completion node 1826, action node 1828, completion node 1832, action node 1834, and completion node 1838. The order may vary in alternate embodiments. In addition the order case statements are placed in the generated code may vary due to the nature of switch statements.

Alternate software implementations will be apparent to one of ordinary skill in the art and are within the scope of the invention. For example, the while statement may be replaced by a "for" statement or "repeat" statement.

One embodiment of the process modeling tool provides debugging functionality through a debugger. In debugging, generated code is run one step at a time to allow a user to analyze the performance of code within a process, possibly to find errors ("bugs") in the code. The user controls execution of the process and may edit code fragments embedded in the graphical representation. The user may also view the graphical representation during debugging.

The code generator in the preferred embodiment generates Java code for the processes embodied in the collaboration. The generated code is marked throughout by non-executable comments (called model markers), which bracket each code fragment with a cross reference to the identity of the action node or other element associated with that code fragment. For processes under debugging, generated code is interspersed with annotations (executable code). During execution of the code, progress events raised by annotations are reported back to the semantic entities. The semantic engine maps the progress events to current activity of the process under debugging, noted by the debugger. The debugger highlights the action node which corresponds to the section of code being executed (containing the annotation which raised the progress event).

After the code generator has generated executable code, the user may execute that code through the process modeling tool. Alternately the executable code may be executed independent of the process modeling tool.

Implementation

The invention may be implemented in hardware of software, or a combination of both. However the invention preferably is implemented in computer programs executing on programmable computers each comprising a processor, a data storage system (including volatile and nonvolatile memory and/or storage elements), at least one input device, and at least one output device. Program code is applied to input data to perform the functions described herein and generate output information. The output information is applied to one or more output devices, in known fashion.

Each program is preferably implemented in a high level procedural or object oriented programming language to communicate with a computer system. However, the programs may be implemented in assembly or machine language, if desired. In any case, the language may be a compiled or interpreted language.

Each such computer program is preferably stored on a storage media or device (e.g., ROM, CDROM, or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

A preferred embodiment of the present invention has been described, along with some variations. Nevertheless, it will be understood that various modifications may be made without departing from the spirit and scope of the invention. For example, the shapes of elements in the graphical representation as shown in the figures may be different in alternate embodiments. Accordingly, it is to be understood that the invention is not to be limited by the specific illustrated embodiments, but only by the scope of the appended claims.

What is claimed is:

1. A method for modeling a process including an ordered sequence of actions, each associated with one or more triggering events and exit events, the method comprising:

graphically representing the sequence of actions and associated trigger and exit events for the process with graphical elements such that the graphical elements are organized to express the process, where functions within the process are represented as action nodes having associated therewith entry and exit criteria and an executable function;

entry and exit criteria for functions within the process are represented as event links having associated therewith a conditional expression that must be satisfied if entry or exit from an action node is to commence;

generation of two or more parallel events within the process is represented by split nodes with two or more asynchronous exit conditions;

synchronization of two or more asynchronous events within the process is represented by join nodes with two or more asynchronous entry conditions; and repetitive functions are represented within the process as repetition nodes characterized by entry and exit criteria and an executable function that includes a repeatable function and repetition factor for controlling a number of repetitions for the repeatable function.

2. An information processing system comprising a processor configured for modeling a process including an ordered sequence of actions, each associated with one or more triggering events and exit events, the system further configured for:

graphically representing the sequence of actions and associated trigger and exit events for the process with graphical elements such that the graphical elements are organized to express the process, where:

functions within the process are represented as action nodes having associated therewith entry and exit criteria and an executable function;

entry and exit criteria for functions within the process are represented as event links having associated therewith a conditional expression that must be satisfied if entry or exit from an action node is to commence;

generation of two or more parallel events within the process is represented by split nodes with two or more asynchronous exit conditions;

synchronization of two or more asynchronous events within the process is represented by join nodes with two or more asynchronous entry conditions; and repetitive functions are represented within the process as repetition nodes characterized by entry and exit criteria and an executable function that includes a repeatable function and repetition factor for controlling a number of repetitions for the repeatable function.

3. The information processing system of claim 2, further comprising a display subsystem coupled to the processor for displaying the sequence of actions and associated trigger and exit events for the process with graphical elements such that the graphical elements are organized to express the process.

4. A computer-readable medium comprising program instructions for graphically representing a sequence of actions and associated trigger and exit events for a process with graphical elements such that the graphical elements are organized to express the process, where:

functions within the process are represented as action nodes having associated therewith entry and exit criteria and an executable function;

entry and exit criteria for functions within the process are represented as event links having associated therewith a conditional expression that must be satisfied if entry or exit from an action node is to commence;

generation of two or more parallel events within the process is represented by split nodes with two or more asynchronous exit conditions;

synchronization of two or more asynchronous events within the process is represented by join nodes with two or more asynchronous entry conditions; and repetitive functions are represented within the process as repetition nodes characterized by entry and exit criteria and an executable function that includes a repeatable function and repetition factor for controlling a number of repetitions for the repeatable function.

* * * * *